UNITED STATES PATENT OFFICE.

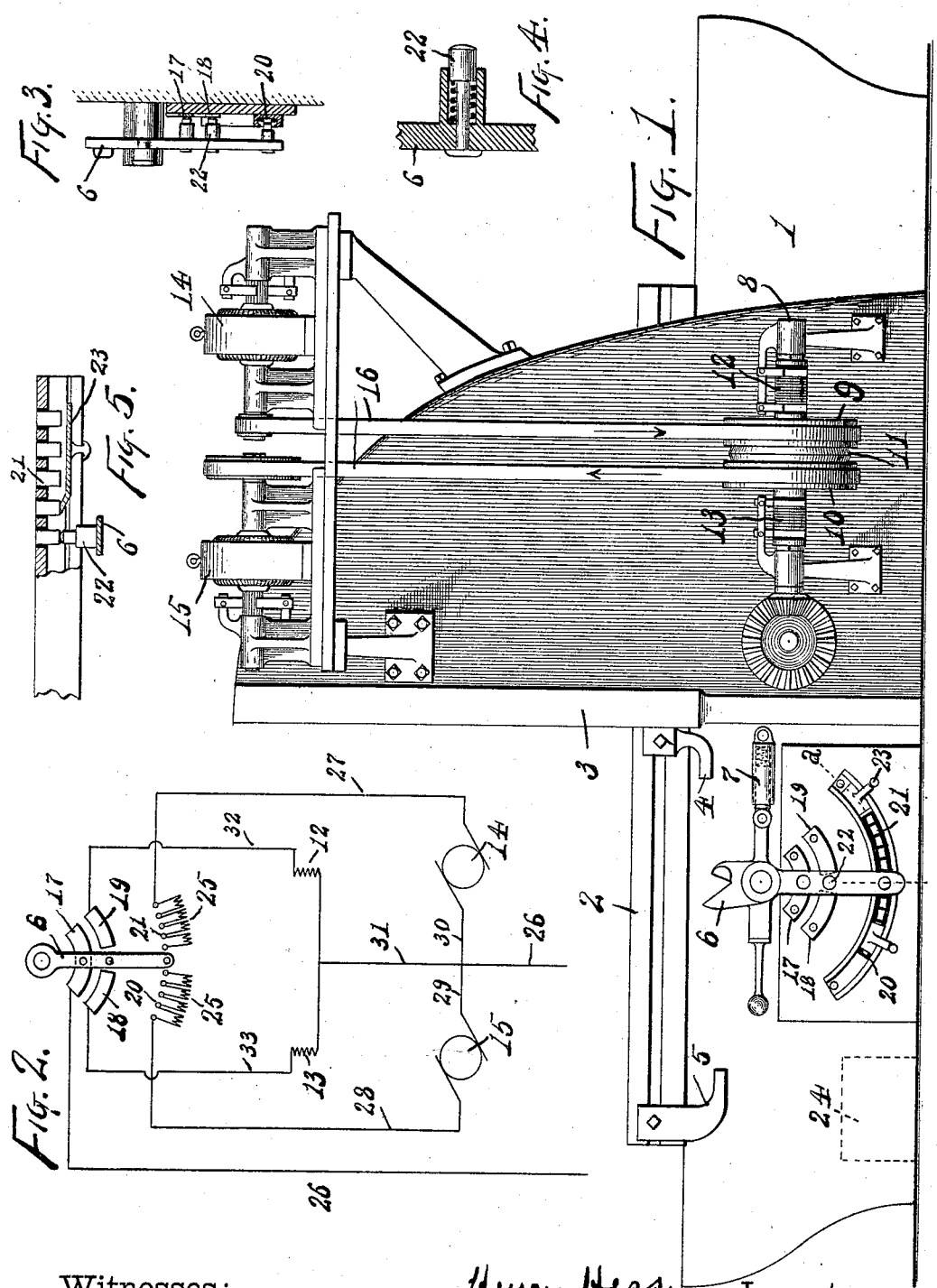

HENRY HESS, OF HAMILTON, OHIO, ASSIGNOR TO THE NILES TOOL WORKS COMPANY, OF SAME PLACE.

METAL-PLANING MACHINE.

SPECIFICATION forming part of Letters Patent No. 570,093, dated October 27, 1896.

Application filed July 10, 1895. Serial No. 555,522. (No model.)

*To all whom it may concern:*

Be it known that I, HENRY HESS, of Hamilton, Butler county, Ohio, have invented certain new and useful Improvements in Metal-Planing Machines, of which the following is a specification.

This invention pertains to metal-planing machines and other reciprocating machines involving the same principles of motion, the improvements having reference to a peculiar system of and mechanism for producing the reciprocating motions.

My invention will be readily understood from the following description, taken in connection with the accompanying drawings, in which—

Figure 1 is a side elevation of a planing-machine exemplifying my invention; Fig. 2, a diagram illustrating the electric circuits employed in the exemplification; Fig. 3, a side elevation of the tumbler with contiguous parts in vertical section; Fig. 4, a vertical section through one of the contact-points of the tumbler, and Fig. 5 a horizontal section of the contact-arc in the plane of line *a* of Fig. 1.

In the drawings, 1 indicates the planer-bed; 2, the table; 3, the housing; 4, the cutting-dog, that is to say, the dog which initiates the cutting motion; 5, the backing-dog; 6, the tumbler, moving as usual, but forming also an electric switch-lever; 7, tumbler-spring; 8, one of the driving-shafts of the planer, turning in alternative directions to produce the cutting or backing strokes of the table; 9, clutch-pulley loose on this shaft and hereinafter termed the "cutting-pulley;" 10, similarly-arranged backing-pulley; 11, clutch member on shaft 8, adapted to engage either of the pulleys 9 and 10 and lock them alternately to the shaft; 12, solenoid for effecting the clutching of pulley 9; 13, solenoid for effecting the clutching of pulley 10, the arrangement constituting a pair of ordinary electromagnetic clutches, either of which clutches will be in action when its appropriate solenoid is energized by current; 14, an electric motor belted to cutting-pulley 9 and hereinafter termed the "cutting-motor;" 15, a similar motor belted to backing-pulley 10 and hereinafter termed the "backing-motor," and 16 belts connecting the motors with their pulleys on shaft 8.

It is obvious that the direction of the table motion will be controlled by solenoids 12 and 13, the table moving in one direction or the other, according to which of the two solenoids is energized. The rate of table motion will be controlled by the speed of the motors, which in turn will be controlled by the amount of current going to the motors. If, while the table is moving in one direction, there be no current to the non-active motor, that motor will be at rest, and if the current to the active motor be reduced to zero the rate of table motion will gradually reach zero, the reduction of rate being controlled by the law of momentum. If, when the table has thus come to rest, current be gradually applied to the previously non-active motor, the table will move in the reverse direction, finally reaching a rate of motion dependent upon the maximum of current put to the motor. Provision is made for gradually applying power to the table in proper recognition of the law of inertia, and provision is also made for regulating the amount of current ultimately going to the motors, so as to secure any desired ultimate working speed for the table in either direction of motion.

Proceeding with the drawings, 17 indicates a contact-arc in connection with one of the mains bringing current to the planer, this arc being always in communication with tumbler 6; 18, backing-arc, to be in communication with the tumbler only when the table is backing or to be backed; 19, cutting-arc, to be in communication with the tumbler only when the table is making or to make its cutting motion; 20, an arc of contact-points in position to be engaged progressively by the tumbler when the tumbler is thrown to backing position, that is to say, position corresponding with the backing motion of the table; 21, similar arc of contacts pertaining to the cutting position of the tumbler; 22, spring contact-points on the tumbler to appropriately engage the various contact-arcs; 23, suppressers in the form of plates adjustable along the arcs 20 and 21, so that the effect of certain contact-points in an arc may be suppressed and the tumbler be made to engage with a given contact-point abnormally to the angular position of the tumblers; 24, a typifying-receptacle for resistance-coils, which receptacle may be placed at any desired position convenient to the circuits; 25, resistance-coils in series with the series of contact-points 20, another set of resistance-coils being in series with contact-points 21, and 26 the mains bringing current to the planer from any suitable source of supply.

In Figs. 1 and 2 the machine and the motors are assumed at rest. The tumbler is in neutral position, current going neither to the motors nor to the clutches. Both motors are therefore at rest and both clutches disengaged. Assume now that tumbler 6 is moved by hand out of the neutral position a trifle into cutting position, that is to say, the lower end of the tumbler swinging to the right. The effect of this is to put current through arc 19 and solenoid 12, thus clutching cutting-pulley 9, the electrical connections being obvious from Fig. 2. Tumbler-spring 7 now causes the tumbler to be moved a trifle farther. The effect of this is to bring the tumbler into connection with the first contact-point of the series of contact-points 21, thus putting current to cutting-motor 14 through the entire group of resistances pertaining to arc 21. This puts minimum current to the cutting-motor 14 and initiates the cutting motion of the table. A further movement of the tumbler, caused by spring 7, connects it with the second one of the contact-points at 21 and cuts out the first resistance, thus increasing the current to the motor, and so on till the tumbler has reached its maximum angular cutting position, when current will be to the cutting-motor 14 free of the resistance-coils at arc 21. Under these conditions maximum current will go to the cutting-motor and the table will be making its cutting stroke at maximum speed. The table has thus been brought to a condition of motion at maximum rate, but gradually, and the motor and resistances should be proportioned in recognition of the laws of inertia, under which conditions the motor seeks to accelerate the motion of the table no faster than that motion is capable of being accelerated. There will thus be no shock at any point in the transmission. When the table is in motion, the tumbler is moved to and beyond the neutral position and within the influence of the tumbler-spring by the dogs in the usual way, the effect of the tumbler motion being, first, to cut current from the motor; second, to release the engaged clutch; third, to engage the other clutch; fourth, to start the other motor, and, fifth, to increase the speed of the new motor till maximum rate is reached and the table is moving in reverse direction at maximum rate.

In ordinary planers in general use no provision is made for variations in table speeds. Such usual qualities in planers would be responded to in my system in the absence of suppressers 23, the final contact-points in arcs 20 and 21 controlling the ultimate speeds for the table, the backing speed being of course greater than the cutting speed, due to the fact, in the exemplification, that the backing-motor has a larger transmitting-pulley than the cutting-motor; but the suppressers 23 permit of the suppression of any desired number of the later contact-points in arcs 20 and 21. In practice there will be a sufficient number of contact-points in each arc to provide for the proper acceleration of the table motions and for the highest desired maximum rate of table motions, that is to say, the throw of the tumbler will cause it to reach final contact-points representing highest desired maximum table speeds. It may be desirable to work far within this maximum and to regulate the working speed with reference to the hardness of material or the weight of the work. In such case suppressers 23 are moved so that their inner ends make contact with such contact-points, in their respective arcs, as represent the desired working speed. Then the tumbler in passing the position of the selected contact-point does not go to succeeding contact-points, but rides up on the suppresser, thus maintaining connection with the selected contact-point and leaving in circuit the resistances controlled by the succeeding contact-point.

In the arrangement of contact-points in arcs 20 and 21 and the coöperating contact-point on the tumbler the latter should have such width of bearing that it will not leave a reached contact-point in the arc until it has made contact with a succeeding one. In Figs. 2 and 5 the contact-points in the arcs have been abnormally separated to avoid confusion. It is to be understood, however, that when the tumbler is in neutral position it is free from either of the arcs 20 or 21, as well as arcs 18 and 19, and that arcs 18 and 19 are so spaced that the tumbler moving from neutral position will engage these arcs before engaging arcs 20 and 21.

While in setting forth an exemplification of my invention I have chosen electrical apparatus, the system is susceptible of realization by means of other apparatus in which a reversing-tumbler or the like first effects the initiation of motor motion and then accelerates that motion in recognition of the law of acceleration of motion of the reciprocating mass being dealt with.

In the selected exemplification is found an ordinary metal-planing machine arranged for variable length of table strokes, the reversing tumbler being, as usual, at a mid-point in the length of the machine. For reciprocating machines having an invariable length of stroke the reversing device, whatever it may be, as well as the device for effecting the acceleration of the motor speed, may be at the center or at the end or ends of the machine, as desired.

I claim as my invention—

1. The combination, substantially as set forth, of a driving mechanism adapted to impart motion at a minimum speed or at a maximum speed or at various selective intermediate speeds, a movable controlling device, as a tumbler, controlling by its position the speed of motion imparted by said driving mechanism, and a reciprocating machine part driven by said driving mechanism and adapted to engage said controlling device and move it first to a position corresponding with minimum speed of impartation, then to a position corresponding with a greater speed of impartation and eventually to a position corresponding with a predetermined one of the intermediate speeds.

2. The combination, substantially as set forth, of a motor, a reciprocating part to be moved in one direction thereby, connections between said motor and said reciprocating part to effect the transmission, means for initiating and gradually accelerating the speed of said motor, and a movable part, as a tumbler, controlling said means and moved by said reciprocating part.

3. The combination, substantially as set forth, of a reciprocating machine part, a pair of motors to move said part in its respective directions of motion a pair of clutches between said motors and said reciprocating part, a movable piece, as a tumbler, arranged to be moved by said reciprocating part, and connections between said movable piece and said motors and clutches for causing the movement of said reciprocating part to effect the throwing of the clutches and the control of the speed of the motors.

4. The combination, substantially as set forth, of a reciprocating machine part, a reversing-tumbler arranged to be moved thereby, a pair of electric motors, a pair of electromagnetic clutches connecting said motors with said reciprocating part, and electrical contact-points and connections controlled by said tumbler and serving to throw the clutches and regulate the speed of the motors.

5. The combination, substantially as set forth, of an electric motor, contact-points and resistances in series therewith, a movable piece in the motor-circuit and adapted to make contact with said contact-points selectively, and a movable suppresser adapted to make contact with a selected one of said contact-points and said movable piece and suppress such of said contact-points as are in the series beyond the selected one.

6. The combination, substantially as set forth, of a motor adapted to run at various selective speeds, a movable piece for controlling by its position the speed of said motor, and a reciprocating machine part driven by said motor and adapted to engage said controlling-piece and move it progressively to positions corresponding with increased motor speeds.

HENRY HESS.

Witnesses:
 Z. B. COES,
 J. W. SEE.